Figures 1, 2:
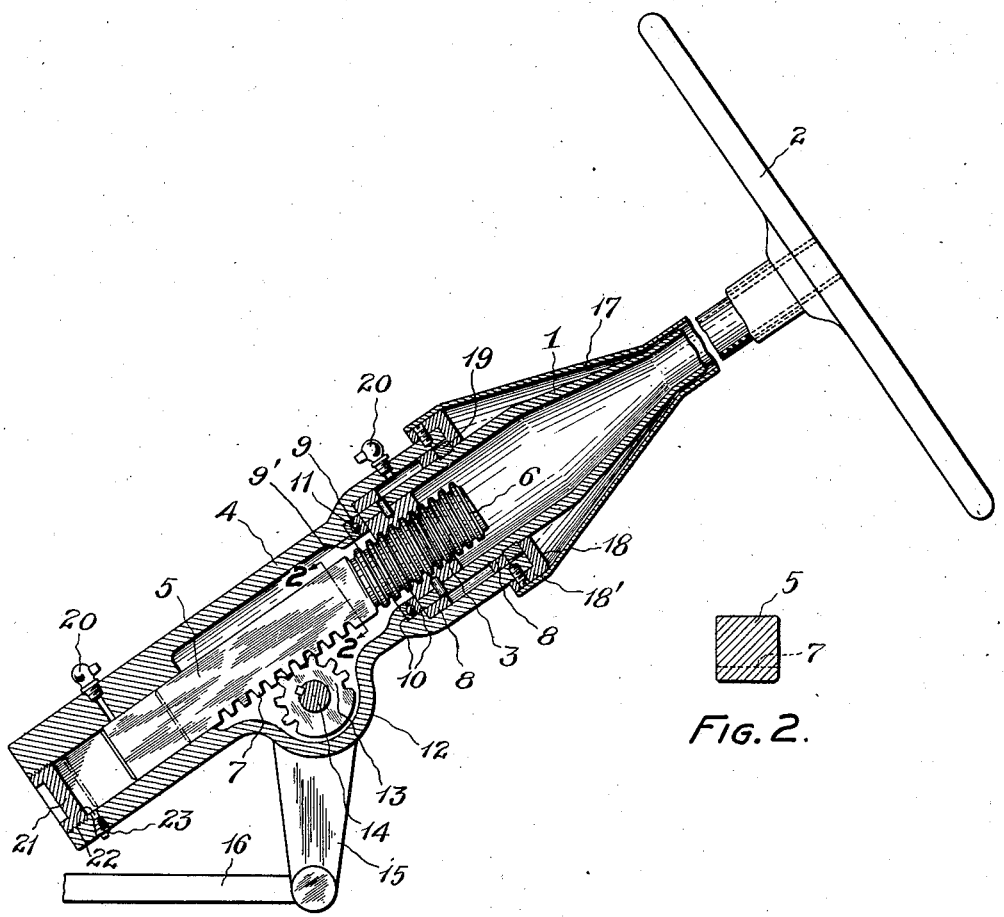

Sept. 14, 1937.    P. J. WELSH    2,093,298
STEERING MECHANISM
Filed March 15, 1937

INVENTOR.
PAUL J. WELSH
BY Saywell and Wesseler
ATTORNEYS

Patented Sept. 14, 1937

2,093,298

UNITED STATES PATENT OFFICE 2,093,298

STEERING MECHANISM

Paul J. Welsh, Cleveland, Ohio

Application March 15, 1937, Serial No. 130,897

2 Claims. (Cl. 74—499)

My invention relates to steering mechanism, and particularly to mechanism of this character designed for steering automobiles, aeroplanes, power boats, bob-sleds, and similar vehicles. The mechanism is designed primarily for use in steering automobiles, and the objects of the invention are to provide for perfect control of the steering, the prevention of vehicle-skidding, obviating undesired turning of the front wheels of the automobile, relieving the arm strain of the operator, mechanism which will be quickly responsive to turning movements of the steering wheel, and which will permit the turning of road corners with comparatively slight movement of the steering wheel. The improved mechanism is particularly serviceable in eliminating vehicle shocks due to the encountering of obstructions on the road, or the dropping into ruts and holes, by the automobile wheels.

The annexed drawing and the following description set forth in detail certain means illustrating my invention, the same disclosing, however, but one of the various forms in which the principle of the invention may be embodied.

In said annexed drawing:

Figure 1 is a central longitudinal section, partially in elevation, of my improved steering mechanism; and Figure 2 is a transverse section, taken in the plane indicated by the line 2—2, Figure 1.

Referring to the annexed drawing, a tubular steering post 1 is secured at its outer end to the hub of a steering wheel 2 and adjacent its inner end is pinned to an interior nut 3. Surrounding the inner end of the steering post 1 and having a portion extended inwardly from the inner end of the steering post 1 is a tubular open-ended housing 4, the inner surface of whose extreme inner end is rectangular in cross-section and forms a sliding surface for the outer surface of the inner end of an elongated block 5. The outer end of the block 5 is of a screw formation 6 engaged by the nut 3, and one side of the intermediate portion of the block 5 is formed with rack teeth 7. The inner surface of the outer end of the housing 4 and the outer surface of the inner end of the steering post 1 are journalled surfaces engaged respectively by the outer and inner surfaces of a pair of bearing rings 8. The housing 4 is formed with a recess 9 forming a shoulder 9', and within this recess, and held by the shoulder 9', the inner end of the post 1, and the inner face of the nut 3, is positioned a pair of opposed ball races 10 containing balls 11 which form a thrust bearing for the inner end of the steering post 1.

Within a lateral outwardly-extended portion 12 of the housing 4 is mounted a gear segment 13 engaged by the rack 7 and having its hub keyed to a transverse shaft 14. To the shaft 14 is secured one end of a lever 15 whose other end is pivotally secured to a rod 16 which is connected to the steering knuckle of the automobile front wheels, in a manner well known to those skilled in the art.

The steering post 1 and the outer end of the housing 4 are covered by a casing 17, the inner end of this casing 17 being secured to the outer surface of an annular cap 18 which is supported upon the outer surface of the steering post 1 and closely engages the outer end of the housing 4. The cap 18 has an inwardly-extending flange 18' which is secured to the outer end of the housing 4. The outer surface of the steering post 1 is recessed adjacent the extreme outer end of the housing 4 to receive a snap ring 19 which engages with its inner side surface the outer side surface of one of the pair of ring bearings 8. For lubricating the several relatively movable surfaces, lubricating fittings 20 are provided, and for closing the inner end of the housing 4 I provide an externally-threaded plug 21. I also provide adjacent the inner end of the housing 4 a drain hole 22 and plug 23 therefor.

It is evident from the foregoing description, taken in connection with the accompanying drawing, that the turning of the wheel 2 will effect a corresponding rotation of the steering post 1 and of the nut 3, without, however, effecting any longitudinal movement of the post 1 and nut 3, and that, consequently, the screw 6 will be fed longitudinally to effect a turning of the gear 13 through the instrumentality of the rack 7, thereby effecting, through the lever 15 and rod 16 and the customary steering knuckle, the desired turning movement of the vehicle front wheels. The extreme inner and outer positions of the inner end of the block 5, during the turning movements effected by the described mechanism, are suggested in Figure 1 by dot-and-dash lines.

The steering mechanism shown and described effects the aforementioned advantages for which it is designed and particularly, due to the action of the screw 6, eliminates road shocks.

What I claim is:

1. Steering mechanism comprising a tubular steering post, means for turning the same, a fixed housing receiving within one end portion one end of the post and a thrust bearing in the housing abutting said post end, a nut secured to and interiorly of the post, a pair of anti-friction members between the housing and the outer surface of said post end, one of said members being disposed adjacently laterally of the extremity of said post end and the other adjacently interiorly of the outer end of said housing end portion, a ring engaging the exterior surface of the post adjacently outwardly of the outer end of said housing end portion and having a flanged portion secured to and over the outer end of said housing end portion, a screw longitudinally-movably mounted in the housing and engaged by the nut, a steering-control member, and means actuated by the longitudinal movements of the screw for actuating the steering-control member.

2. Steering mechanism comprising a fixed housing, a thrust bearing therein and disposed adjacent one end thereof, a tubular steering post having an end disposed in said housing and abutting said bearing, a steering wheel secured to the opposite end of the post, anti-friction members between the inner surface of said housing end and the adjacent outer surface of the steering post, a snap-ring engaging the exterior surface of the steering post within and adjacent the outer end of the housing, a ring engaging the exterior surface of the post adjacently outwardly of said snap ring and having a flanged portion secured to and over the outer end of the housing, a casing secured at one end to the exterior surface of the flanged portion of said ring and secured at its other end to the steering post adjacent the steering wheel, a nut secured to and within the post, a longitudinally-movable block mounted in the housing having an end surface portion adapted to slide upon the inner surface of the housing, an opposite screw portion engaged by the nut, and an intermediate portion formed with a rack, a gear rotatably mounted in the housing and engaged by the rack, and steering-control mechanism actuated by the rotation of the gear.

PAUL J. WELSH.